Aug. 8, 1944.    E. B. NICKLES    2,355,234
VEHICLE
Filed Oct. 2, 1942    3 Sheets-Sheet 1

INVENTOR.
EDWARD B. NICKLES
BY
ATTORNEY.

Aug. 8, 1944.　　　　E. B. NICKLES　　　　2,355,234
VEHICLE
Filed Oct. 2, 1942　　　　3 Sheets-Sheet 2

INVENTOR.
EDWARD B. NICKLES
BY
ATTORNEY.

Aug. 8, 1944.  E. B. NICKLES  2,355,234
VEHICLE
Filed Oct. 2, 1942  3 Sheets-Sheet 3
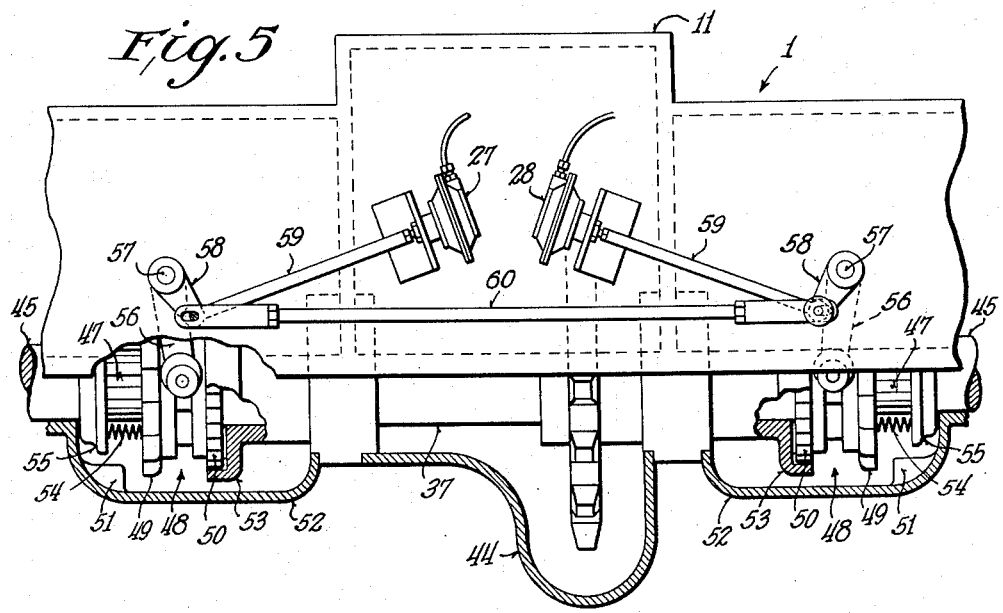
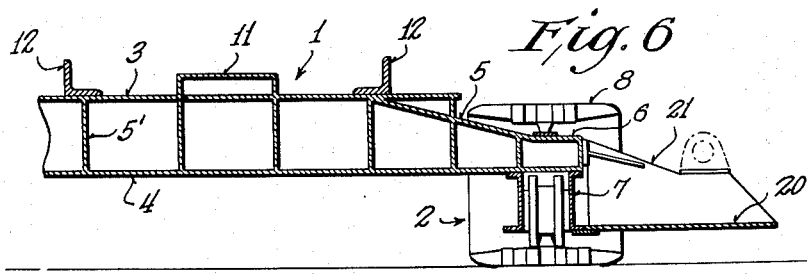
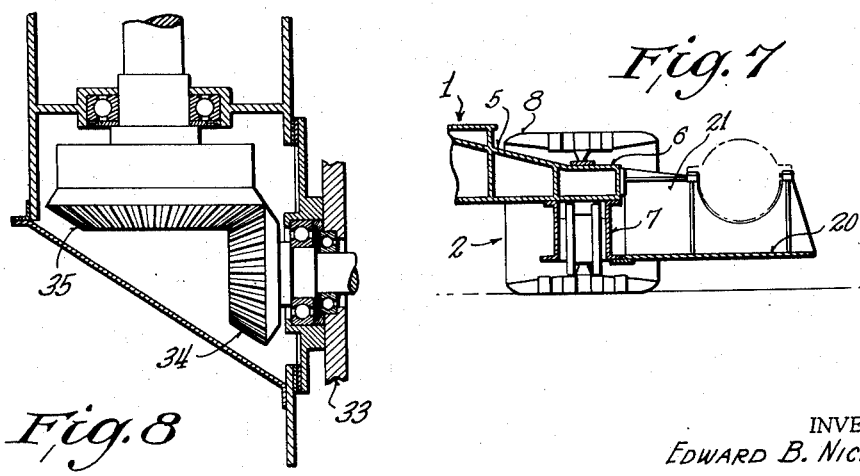
INVENTOR.
EDWARD B. NICKLES
BY
ATTORNEY.

Patented Aug. 8, 1944

2,355,234

UNITED STATES PATENT OFFICE 2,355,234

VEHICLE

Edward B. Nickles, Manitowoc, Wis., assignor to Manitowoc Shipbuilding Company, Manitowoc, Wis.

Application October 2, 1942, Serial No. 460,536

6 Claims. (Cl. 180—9.1)

This invention relates to vehicles and is particularly directed to a vehicle for carrying large unwieldy objects.

In transporting very large objects, such for instance as sections of submarines or large penstock sections, a great deal of difficulty has been encountered. When it is considered that the sections have to be moved into and out of sheds, it is immediately apparent that with the ordinary means of transporting such sections a very large doorway or opening is required. In addition to this, in placing or removing the sections it is desirable to have the cranes or other lifting means at each end of the vehicle as close as need be and therefore it is imperative that the vehicle be so constructed as to allow both the vehicle and the section or other object to pass through a doorway of not much larger size than that required to pass the section only and also to have the vehicle free from obstructions both in its front and rear portion.

Objects of this invention are to provide a novel form of crawler mounted carrier or vehicle which is so constructed that it has a car body supported on widely spaced crawler frames with the car body not substantially higher than the height of the crawler assembly to thereby conserve head room, and to provide a power plant located on the side of the vehicle outside of the adjacent crawler assembly, the power plant including a station or seat for the operator and control devices for controlling the crawlers, the direction of travel, and the turning of the device, and to so arrange the vehicle that the power plant and operator are both located in the space on the side of the vehicle which the section of the submarine or penstock overhangs so that the vehicle, with the section mounted thereon, will pass through a doorway which need not be very much larger than that required for the passage of the section alone.

Further objects are to provide a novel type of vehicle as hereinabove described in which the power plant is supported from the car body and the adjacent crawler frame and is located on the side of the vehicle and outside of the adjacent crawler assembly, and in which the power drive from the power plant extends through the adjacent crawler assembly, and in which the reduction mechanism and clutch mechanism are distributed within the car body so as not to require additional head room.

An embodiment of the invention is shown in the accompanying drawings, in which:

Figure 5 is a fragmentary rear elevation with parts in section.

Figure 6 is a line section on the line 6—6 of Figure 3.

Figure 7 is a line section on the line 7—7 of Figure 3.

Figure 8 is a fragmentary detail section of a portion of the power drive.

Figure 1:
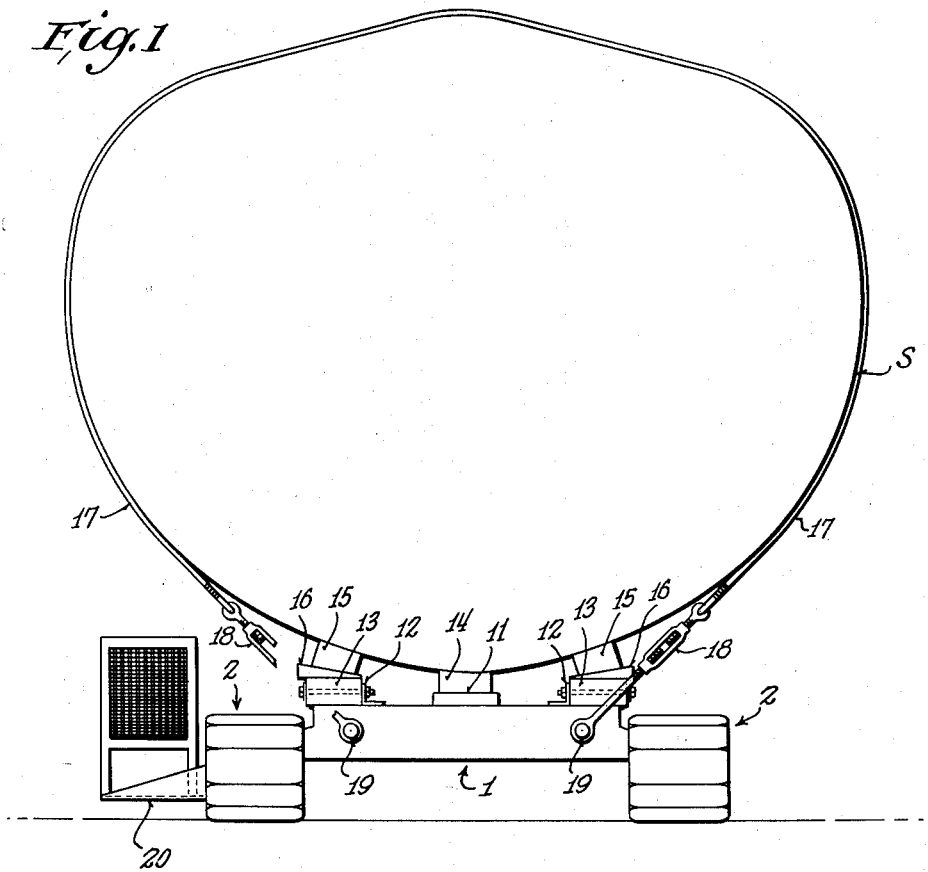
Figure 1 is a front elevation of the carrier or vehicle with a section of a submarine thereon.

Referring to the drawings, it will be seen that the device comprises a car body 1 and crawler assemblies indicated generally at 2 located on opposite sides of the car body and supporting the car body. The car body, it will be noted from Figure 1, is not much higher than the height of the crawler assemblies and it will also be noted, particularly from Figure 3, that the vehicle is wide in order to secure lateral stability. The car body 1 is made up of a web or cellular steel structure having upper and lower walls 3 and 4 joined by intermediate webs 5'. The upper lateral portions of the car body are formed by means of a downwardly and outwardly slanting section 5 and the section 5 is joined to the lower wall 4 by means of webs as shown in Figure 6.

It is preferable to form the extreme marginal portions of the car body of hollow box like shape as indicated at 6 in Figure 6. This portion of the car body rests directly upon the crawler frames 7 so as to have the maximum strength and rigidity for the structure. The crawler frames are provided with the usual supporting rollers and carry the crawler sections 8. The crawler sections 8 are driven by means of rear sprockets 9, see Figure 3, which receive the projecting internal teeth of the crawler sections in the usual manner. These sprocket wheels 9 are driven by means of a pair of sprocket wheels 10 which are connected by means of chains with the reduction mechanism hereinafter described.

Figure 3:
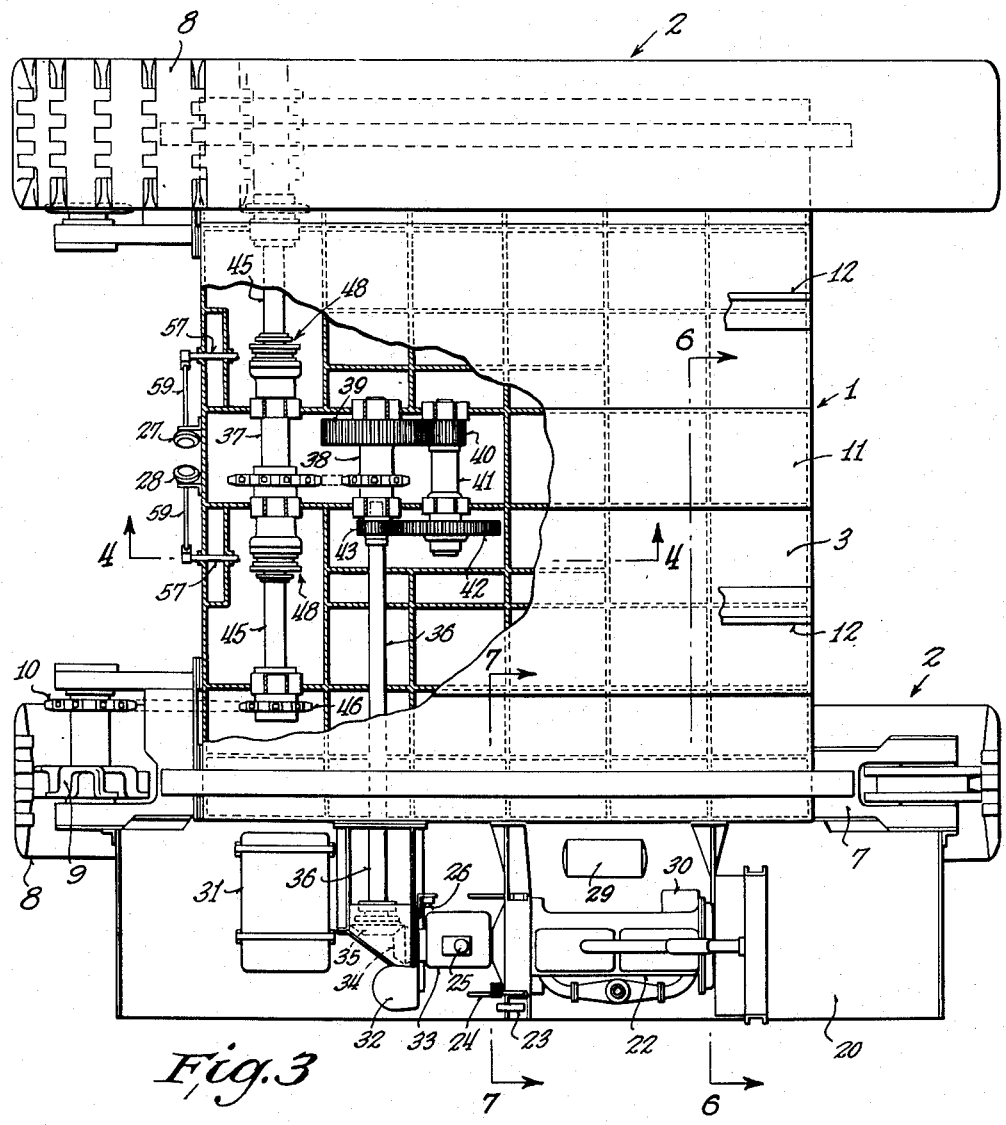
Figure 3 is a plane view of the vehicle with parts broken away and parts in section.
Figure 4:
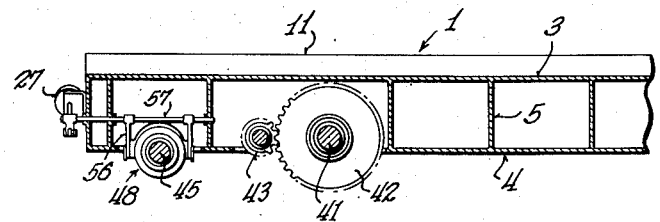
Figure 4 is a fragmentary section on the line 4—4 of Figure 3.

It is to be noted from Figures 1, 3 and 6 that the central portion of the car body 1 is in the form of a hollow box like longitudinally extending member 11 which projects upwardly above the surface of the car body.

The car body is provided with flanges 12 which extend longitudinally thereof spaced inwardly from the marginal edges of the top of the car body. Longitudinally extending wooden beams 13 are bolted to the flanges 12.

The section of the submarine which is shown in Figure 1 is supported from the central portion 11 and from the beams 13. It is preferable to provide spacing beams or blocks 14 and 15, as shown in Figure 1, and to drive wedges 16 in between the beams 13 and 15 to make the beams 15 conform to the slanting or curved bottom outline of the submarine section. The submarine section is tied or held to the car body by means of chains or cables 17 which pass around the submarine section or which may be secured to lugs or other portions thereof. These chains or cables 17 are tightened by means of turnbuckles 18. The final point of attachment to the car body is indicated at 19 in Figure 1.

The car body can be made in any suitable manner. It may be cast in sections or as a unit if so desired. It also may be made up by welding sections together to form the multicellular structure of the car body.

The power plant and the operator's station and the control means are all located at the side of and beyond the outline of the body of the vehicle and also are located beneath the overhanging portion of the submarine section, as shown in Figure 1, so that the power plant neither requires the elevation of the submarine section, thereby keeping the head room required at a minimum, nor does the power plant project laterally beyond the horizontal outline of the submarine section, thereby enabling the vehicle with the submarine section thereon to pass through doorways of scarcely larger size than that required for the passage of the submarine section itself.

The power plant is supported from a platform 20 which is arranged in line with the lower flange of the crawler frame and secured thereto. At intervals outwardly projecting webs 21 support the platform 20, such webs being secured to the platform and to the car body 1, suitable bracing being provided as indicated.

The power plant includes the internal combustion engine or other suitable motor means indicated at 22 in Figure 3, and is provided with the controls which may consist of the throttle and clutch levers 23 and 24 and the gear shift lever 25 and a lever 26 for selectively controlling the main clutches of the crawlers, as will hereinafter be described. The main clutches are operated by means of the pneumatic clutch operating members 27 and 28 which are selectively supplied with compressed air on suitable manipulation of the lever 26, the compressed air being stored in the tank 29 and furnished by means of an air pump 30 driven from the engine, see Figure 3.

Figure 2:
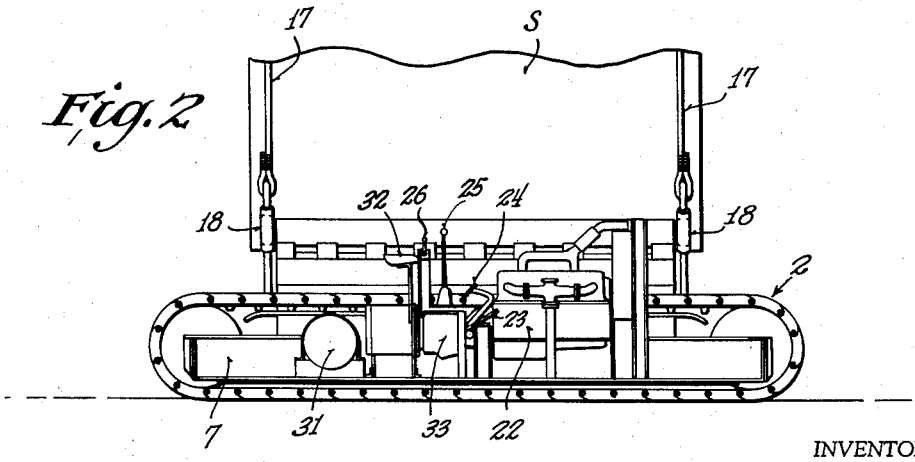
Figure 2 is a side elevation of the structure shown in Figure 1 with the upper portion of the submarine section broken away.

The fuel tank is indicated at 31 in Figures 2 and 3 and the operator's seat or station at 32. The power plant is so arranged that it does not project upwardly to a great extent but is kept relatively low, as shown most clearly in Figures 1 and 2. The power plant, the controls, the engine, and the operator's seat or station are all positioned below the overhanging portion of the submarine section S, as shown in Figure 1.

The drive is from the motor 22 through the transmission 33 to a bevel gear 34 which in turn meshes with the bevel gear 35 mounted on a horizontally extending shaft 36. This power shaft 36 extends through the crawler frame and the reduction mechanism is distributed within the car body. It is preferable to house the bevel gears 34 and 35 as they are closely adjacent the operator's station, such housing being of any suitable form as shown for example in Figures 3 and 8.

The final drive shaft is indicated at 37 and is suitably journaled and supported within the car body. It is connected with the shaft 36 by suitable reduction mechanism which may include the chain drive connecting the shaft 37 with the shaft 38.

The shaft 38 is provided with a large gear 39 meshing with a pinion 40 on a shaft 41. The shaft 41 in turn is provided with a large gear 42 meshing with a pinion 43 carried by the power shaft 36. The inner end of the power shaft may be conveniently journaled within the end of the relatively heavy shaft 38 as indicated in Figure 3. It is to be understood that the different gears and drives are substantially housed within the car body. The lower portion of the car body adjacent these members may be provided with suitable removable housings or portions, one of which is indicated at 44 in Figure 5.

From an examination of Figure 3 it is apparent that by distributing the reduction mechanism within the car body it is possible to house all of these parts without requiring the car body to be higher than that necessary for its structural strength, and in this way the head room required for the carrier or vehicle is kept very low.

Sprocket shafts 45 are mounted in alignment with the drive shaft 37 and the ends of these sprocket shafts 45 are journaled in the ends of the drive shaft 37 in a manner similar to that shown for the shafts 36 and 38. The shafts 45 carry sprocket wheels 46 at their outer ends which are connected by means of chains with the sprockets 10 of the crawler sections.

Clutch means are provided so that the shafts 45 can be selectively or simultaneously locked to the drive shaft 37 and so that the shafts 45 may be individually locked against rotation. The shafts 45 are splined as indicated at 47 and a sliding clutch member indicated generally at 48 is provided. This clutch member has a toothed section 49 at its outer side and a toothed section 50 at its inner side. The section 49 is adapted to engage one or more ears or projections 51 formed in the stationary casing 52 to thus lock the shaft 45 against rotation. The toothed section 50 is adapted to engage the internally toothed section 53 so as to lock the shaft 45 to the drive shaft 37. Normally the clutch members 48 are urged inwardly by means of springs 54 which are mounted between the collar 55 rigid on the shaft 45 and the clutch member 48. However, either of the clutch members may be moved outwardly by means of the corresponding pivoted arms 56, see Figure 5, which engage yoke structures riding loosely in the clutch members 48. These arms are mounted on rock shafts 57, see Figures 3 and 5, and the rock shafts carry crank arms 58 which are connected to the plunger rods 59 of the pneumatic members 27 and 28. The crank arms 58 are connected by means of the rod 60 which has slotted end portions as shown. The purpose of this connecting rod 60 is to prevent the simultaneous movement of both clutch members outwardly into position to lock both shafts 45 against rotation.

If this should happen, it has been found that when the vehicle tends to shift, frequently the clutches are locked out in shaft locking position and will not be moved to clutch closed position by means of their springs 54. To guard against this it is intended that only one clutch member shall lock its corresponding shaft 45 against rotation at any given time. For example, if the right-hand clutch member viewed in Figure 5 were moved to shaft locking position by means of the pneumatic member 28, there is sufficient play in the slotted lever 60 to allow such motion while the other clutch member remains in its closed position. However, if compressed air is admitted to the member 27, such member cannot rock the left-hand clutch as viewed in Figure 5 into shaft locking position without first retracting the right-hand clutch member from shaft locking position.

When it is desired to lock the vehicle against motion, one of the shafts 45 is locked against rotation and locks its corresponding crawler. If the engine clutch is left open, the vehicle will be locked against motion. However, if the engine clutch is left closed and the engine running, the vehicle will tend to turn about the locked crawler. In this way it is possible to either lock the vehicle against motion or to steer the vehicle.

It will be seen that a very stable carrier or vehicle has been provided by this invention for carrying very large objects, such as sections of a submarine, penstock or other objects of relatively large size.

It will be seen further that very little more head room is required in doorways, for example, for the combined vehicle and submarine section than that required for the section itself. This is accomplished by putting the power plant and operator's station and control devices below an overhanging portion of the carried object. It is also accomplished by spreading the reduction gearing out or, in other words, distributing it within the car body so that no extra height is required on account of this reduction mechanism. A further way in which the height of the carrier is kept at a minimum is by having the power plant spaced outwardly from the reduction mechanism and having the power transmitted through a power shaft through one of the crawler sections.

It will be seen, therefore, that although a relatively powerful power plant is employed as well as relatively large and sturdy reduction mechanism, that nevertheless these parts are distributed throughout the vehicle in such a manner that none of them adds to the height of the vehicle itself and thus it is possible to keep the center of gravity of the combined submarine section and vehicle relatively low and thus enhance stability as well as making it possible to pass through doorways with a minimum requirement of head room.

It is also an important feature of this invention to have the power plant out at the side of the vehicle and neither in front nor behind it. In this way it is possible to load and unload a submarine section by moving two cranes up to the front and rear of the vehicle, as there is no power plant at either end to interfere and to take up room. Instead the cranes can come as close as need be to the front and rear of the vehicle. Further the arrangement gives the operator an unobstructed forward or rear view.

It is to be noted that the car body is made of a multitude of cellular portions to thereby secure great strength and rigidity and that certain of the cellular portions or chambers are used to house the reduction mechanism and main clutch mechanisms as well as certain of the chain drives, thus adding to the compactness of the structure and keeping the height of the complete assembly at a minimum.

The expression "power plant" is intended to cover not only an internal combustion engine as shown but any motor means whatsoever whether electric or otherwise.

Although this invention has been described in considerable detail, it is to be understood that such description is intended as illustrative rather than limiting, as the invention may be variously embodied and is to be interpreted as claimed.

I claim:

1. A vehicle for carrying large objects comprising a relatively low car body for supporting the object to be carried, crawlers on each side of said car body, a supporting structure projecting outwardly laterally of one of said crawlers, a power plant located at the side of said car body and outside of the adjacent crawler and supported from said supporting structure, and power transmitting mechanism carried by said car body and operatively connecting said power plant and said crawlers, said power transmitting mechanism having a portion extending through the adjacent crawler.

2. A vehicle for carrying objects larger than the vehicle comprising a relatively low car body for supporting the object to be carried, crawlers on each side of said car body, a supporting structure projecting outwardly laterally of one of said crawlers, a power plant located at the side of said car body and outside of the adjacent crawler and supported from said supporting structure, and power transmitting mechanism carried by said car body and operatively connecting said power plant and said crawlers, said power plant including motor means, control means, and an operator's station, all of said power plant being adapted to be overhung by the object carried by said vehicle.

3. A vehicle for carrying large objects comprising a relatively low car body for supporting the object to be carried, crawlers on each side of said car body, a supporting structure projecting outwardly laterally of one of said crawlers, a power plant located at the side of said car body and outside of the adjacent crawler and supported from said supporting structure, and power transmitting mechanism carried by said car body and operatively connecting said power plant and said crawlers, said power transmitting mechanism including reduction mechanism and clutch mechanism, said reduction mechanism and clutch mechanism being spread longitudinally and laterally within said car body, whereby the vertical height required for the car body is minimized.

4. A vehicle for carrying large objects comprising a relatively low car body for supporting the object to be carried, crawlers on each side of said car body, a supporting structure projecting outwardly laterally of one of said crawlers, a power plant located at the side of said car body and outside of the adjacent crawler and supported from said supporting structure, power transmitting mechanism carried by said car body and operatively connecting said power plant and said crawlers, said power transmitting mechanism including reduction mechanism located within said car body, and a power transmitting shaft for transmitting energy from the engine to the reduction mechanism, said power transmitting shaft extending through the crawler adjacent the power plant.

5. A vehicle for carrying large objects comprising a relatively low car body for supporting the object to be carried, crawlers including crawler sections and crawler frames located on opposite sides of the car body, said car body resting upon said crawler frames, a supporting structure projecting outwardly laterally from one of said crawler frames and supported jointly by said crawler frame and said car body, a power plant carried on said supporting structure, and power transmitting means extending from said power plant to said crawlers.

6. A vehicle for carrying large objects comprising a relatively low car body for supporting the object to be carried, crawlers on each side of said car body, a supporting structure projecting outwardly laterally of one of said crawlers, a power plant located at the side of said car body and outside of the adjacent crawler and supported from said supporting structure, and power transmitting mechanism carried by said car body and operatively connecting said power plant and said crawlers, said power transmitting mechanism including reduction mechanism and clutch mechanism, said reduction mechanism and clutch mechanism being spread longitudinally and laterally within said car body, whereby the vertical height required for the car body is minimized, said car body being formed of a multi-cellular structure, certain of the cells of said car body housing elements of said power transmitting mechanism.

EDWARD B. NICKLES.